(12) United States Patent
Shrivastava et al.

(10) Patent No.: US 12,062,059 B2
(45) Date of Patent: Aug. 13, 2024

(54) SELF-SUPERVISED SYSTEM GENERATING EMBEDDINGS REPRESENTING SEQUENCED ACTIVITY

(71) Applicant: Microsoft Technology Licensing, LLC, Redmond, WA (US)

(72) Inventors: Mayank Shrivastava, Woodinville, WA (US); Sagar Goyal, Vancouver (CA); Sahil Bhatnagar, Vancouver (CA); Pin-Jung Chen, Bellevue, WA (US); Pushpraj Shukla, Dublin, CA (US); Arko P. Mukherjee, Issaquah, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 226 days.

(21) Appl. No.: 16/930,279

(22) Filed: Jul. 15, 2020

(65) Prior Publication Data
US 2021/0365965 A1 Nov. 25, 2021

(30) Foreign Application Priority Data
May 25, 2020 (IN) .............................. 202041021829

(51) Int. Cl.
*G06Q 30/0202* (2023.01)
*G06N 3/04* (2023.01)
(Continued)

(52) U.S. Cl.
CPC ........... *G06Q 30/0202* (2013.01); *G06N 3/04* (2013.01); *G06N 3/084* (2013.01); *G06N 20/00* (2019.01)

(58) Field of Classification Search
None
See application file for complete search history.

(56) References Cited

U.S. PATENT DOCUMENTS

| 7,958,066 B2 | 6/2011 | Pinckney et al. |
| 9,092,802 B1 | 7/2015 | Akella |

(Continued)

FOREIGN PATENT DOCUMENTS

JP 5389273 B1 1/2014

OTHER PUBLICATIONS

T. Li, Y. Ma, J. Xu, B. Stenger, C. Liu and Y. Hirate, "Deep Heterogeneous Autoencoders for Collaborative Filtering," 2018 IEEE International Conference on Data Mining (ICDM), 2018, pp. 1164-1169, doi: 10.1109/ICDM.2018.00153. (Year: 2018).*

(Continued)

*Primary Examiner* — Chesiree A Walton
(74) *Attorney, Agent, or Firm* — Foley IP Law, PLLC

(57) ABSTRACT

The disclosure herein describes a system for generating embeddings representing sequential human activity by self-supervised, deep learning models capable of being utilized by a variety of machine learning prediction models to create predictions and recommendations. An encoder-decoder is provided to create user-specific journeys, including sequenced events, based on human activity data from a plurality of tables, a customer data platform, or other sources. Events are represented by sequential feature vectors. A user-specific embedding representing user activities in relationship to activities of one or more other users is created for each user in a plurality of users. The embeddings are updated in real-time as new activity data is received. The embeddings can be fine-tuned using labeled data to customize the embeddings for a specific predictive model. The embeddings are utilized by predictive models to create product recommendations and predictions, such as customer churn, next steps in a customer journey, etc.

20 Claims, 16 Drawing Sheets

(51) Int. Cl.
   *G06N 3/084*   (2023.01)
   *G06N 20/00*   (2019.01)

(56) References Cited

U.S. PATENT DOCUMENTS

| | | | |
|---|---|---|---|
| 9,576,262 | B2 | 2/2017 | Ganguly et al. |
| 9,652,714 | B2 | 5/2017 | Achin et al. |
| 2015/0032444 | A1 | 1/2015 | Hamada |
| 2017/0372206 | A1 | 12/2017 | Kavadiki et al. |
| 2018/0322394 | A1* | 11/2018 | Nguyen ............... G06N 20/00 |
| 2019/0139092 | A1* | 5/2019 | Nomula ............... H04L 67/02 |
| 2019/0303404 | A1 | 10/2019 | Amer et al. |
| 2019/0347523 | A1 | 11/2019 | Rothberg et al. |
| 2020/0045354 | A1* | 2/2020 | Gao ..................... G06F 16/583 |
| 2020/0107072 | A1* | 4/2020 | Lomada ............... G06N 3/084 |
| 2020/0273052 | A1* | 8/2020 | Ganti .................. G06Q 30/0204 |
| 2021/0231449 | A1* | 7/2021 | Hu ....................... G06V 10/82 |
| 2022/0027608 | A1* | 1/2022 | Byeon ................. G06V 30/1983 |

OTHER PUBLICATIONS

Huang et al; Improving Sequential Recommendation with Knowledge-Enhanced Memory Networks; SIGIR '18: The 41st International ACM SIGIR Conference on Research & Development in Information Retrieval Jun. 2018 pp. 505-514 (Year: 2018).*

Damian, et al., "Advanced Customer Activity Prediction Based on Deep Hierarchic Encoder-Decoders," 2019 22nd International Conference on Control Systems and Computer Science (CSCS), Bucharest, Romania, 2019, pp. 403-409, (Year: 2019).*

Li et al. , "Deep Heterogeneous Autoencoders for Collaborative Filtering," 2018 IEEE International Conference on Data Mining (ICDM), Singapore, 2018, pp. 1164-1169 (Year: 2018).*

Brazilian E-Commerce Public Dataset by Olist, Retrieved from: https://web.archive.org/web/20190405021840/https:/www.kaggle.com/olistbr/brazilian-ecommerce, Apr. 5, 2019, 4 Pages.

Retailrocket Recommender System Dataset, Retrieved from: https://web.archive.org/web/20170903200440/https:/www.kaggle.com/retailrocket/ecommerce-dataset, Sep. 3, 2017, 8 pages.

WSDM—KKBox's Churn Prediction Challenge, Retrieved from: https://www.kaggle.com/c/kkbox-churn-prediction-challenge/leaderboard, Retrieved on Apr. 14, 2020, 1 Page.

Mitrovic, Sandra, "On Feature Engineering and Network Representation Learning for Telco Churn Prediction", In Dissertation Presented to Obtain the Degree of Doctor in Business Economics, May 2019, 183 Pages.

Rudin, et al., "Learning Theory Analysis for Association Rules and Sequential Event Prediction", In the Journal of Machine Learning Research, vol. 14, No. 1, Jan. 1, 2013, pp. 3441-3492.

International Search Report and Written Opinion Issued in PCT Application No. PCT/US21/028529, Mailed Date: Jul. 14, 2021, 13 Pages.

* cited by examiner

SELF-SUPERVISED SYSTEM GENERATING EMBEDDINGS REPRESENTING SEQUENCED ACTIVITY

BACKGROUND

Many businesses utilize large scale enterprise data, most of which is tabular/structured data containing customers profiles and customer activities in the form of visit log, sale log and other transactions. This data frequently comes together in a Customer Data Platform (CDP) from various sources. The data can be analyzed by predictive models to generate predictions, which can include, for example, churn prediction, lifetime value prediction, product recommendations, purchase propensity etc. Currently, most of these predictive scenarios are done on customized models that are built by working directly with customers. These models can be time-consuming and costly to develop. Moreover, custom models are not scalable across customers and do not work out of the box (OOB).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some examples provide a system for generating embeddings representing sequential human activity. A data storage device stores unlabeled activity data associated with a plurality of users and a set of time indicators associated with the unlabeled activity data. The activity data describes events having order over time. A sequencing component creates a plurality of user-specific journeys based on the unlabeled activity data. A user-specific journey includes a set of sequential feature vectors corresponding to a set of events associated with selected user placed into a sequence in accordance with the set of time indicators. An embedding component generates a plurality of embeddings based on sequential feature vectors in the plurality of user-specific journeys and non-sequential feature vectors associated with the plurality of users. An embedding includes a set of fixed length vectors representing sequential human activity of the selected user. The plurality of embeddings configured for utilization by a plurality of prediction models for generating user-specific activity predictions and recommendations.

Other examples provide a method of generating embeddings representing sequential human activity. A sequencing component creates a plurality of user-specific journeys based on unlabeled activity data obtained from a plurality of data sources. An embedding component generates a plurality of embeddings based on sequential feature vectors in the plurality of user-specific journeys and non-sequential feature vectors associated with the plurality of users. The plurality of embeddings comprising one embedding for each user in the plurality of users. The plurality of embeddings is output to a set of machine learning (ML) prediction models for generating user-specific activity predictions and recommendations based on the activity data associated with the plurality of users.

Still other examples provide a computer storage device having computer-executable instructions stored thereon for generating embeddings representing sequential human activity, which, on execution by a computer, cause the computer to perform operations including generating at least one user-specific journey based on unlabeled activity data describing human activities associated with at least one user; creating at least one embedding based on sequential feature vectors in the user-specific journey. An embedding comprising a set of fixed length vectors representing sequential human activity of the user for generating user-specific activity predictions and recommendations by a plurality of prediction models. Analyzing the at least one embedding by a set of prediction models to generate a set of predictions associated with the at least one user. The set of predictions including at least one prediction or recommendation.

BRIEF DESCRIPTION OF THE DRAWINGS

The disclosed examples are described in detail below with reference to the accompanying drawing figures listed below.

DETAILED DESCRIPTION

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Some aspects of the disclosure describe a system for generating customer activity sequence prediction and recommendation (CASPR) embeddings representing sequenced user activity. The system utilizes a self-supervised neural network which does not need much human input. This reduces or eliminates user time spent building and training customized models.

The system in other examples generates self-supervised deep embeddings based on customer activity sequences for business prediction problems, such as predicting churn or generating product recommendations. The deep learning approach enables the system to encapsulate semantic information about user and their activity patterns and behaviors as embeddings which are task independent, and common across prediction problems. The embeddings are compatible for consumption by various prediction models. The embeddings generated by the system may be used to solve business prediction problems without the need to customize features for every problem.

In other examples, the examples provide a self-supervised activity sequencing model that generates embeddings which are standardized such that the embeddings can be generated with minimal input from an external customer. The generated embeddings are self-supervised, scalable and can serve as the common base layer across different end applications, such as predicting customer churn, recommending products for customers, lifetime business value of customers, etc. The resulting predictions made using such embeddings are much better than standardized machine learning model predictions, and the embeddings compare favorably even against custom-made specific models by data scientists.

Figure 1:
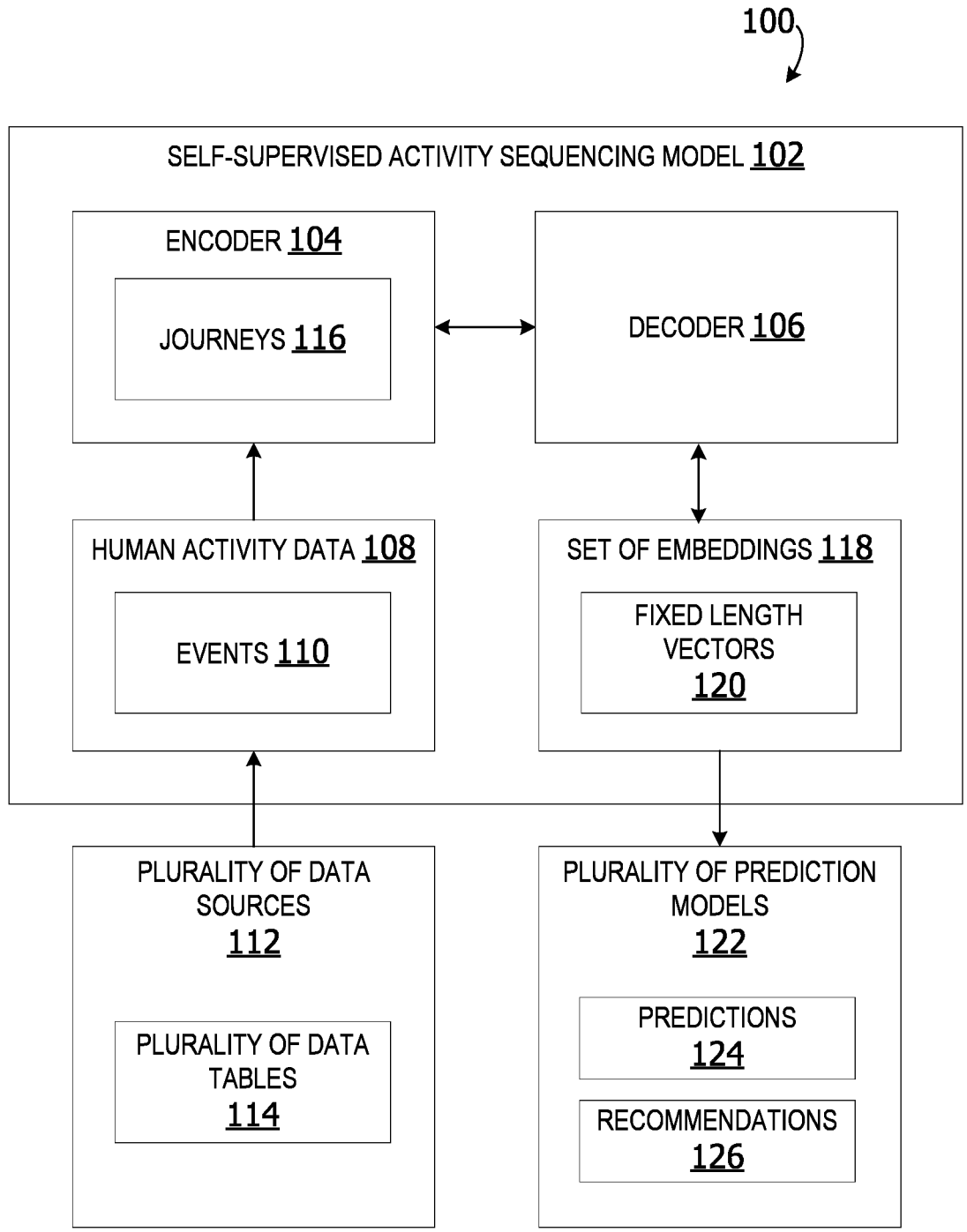
FIG. 1 is an exemplary block diagram illustrating a system for generating fixed-length embeddings representing sequenced human activity for use in generating predictions and product recommendations.

FIG. 1 is an exemplary block diagram illustrating a system 100 for generating fixed-length embeddings representing sequenced human activity for use in generating predictions and product recommendations. In some examples, a self-supervised activity sequencing model 102 is a self-supervised, neural network deep learning model having an encoder 104 and decoder 106 framework. The encoder 104 analyzes human activity data 108 describing events 110 having an order in time obtained from a plurality of data sources 112.

In some examples, the human activity is described as customer data. However, in other examples, the human activity is patient activity data, education/student activity data, travel activity data, sports data, or any other type of data. In one example, patient history data, including hospitalization, immunization data, diet, exercise, and other health related data, could be used by the system to generate health related predictions and/or generate recommendations associated with diet, exercise, check-ups, etc.

The plurality of data sources 112 includes any sources of human activity data 108. The plurality of data sources 112 in some examples includes a plurality of data tables 114 storing or organizing different types of activity data for one or more users. Some non-limiting examples of activity data stored on the plurality of data tables 114 includes, for example but without limitation, visit logs, customer support calls, subscription data, transaction data, product return data, web search data, or any other data describing human activities or events.

The encoder 104 in some examples is a neural network algorithm that analyzes the human activity data from the plurality of data sources to create unified customer journeys 116. A journey in the journeys 116 places the events 110 described in one or more data sources into a single, unified timeline or sequence of activities. In other words, the journeys 116 provide a set of one or more sequenced events for each user in a plurality of users based on data from the plurality of data sources 112.

The encoder 104 performs a sequence to vector conversion to generate a set of one or more embeddings based on the one or more customer journeys 116. An embedding in the set of embeddings 118 is a set of one or more fixed-length vectors representing the set of events in a given user-specific journey in the journeys 116. In some examples, an embedding includes a set of ten (10) vectors representing the set of events in the user journey. However, the examples are not limited to a ten-vector embedding. In other examples, an embedding can include eight vectors, twelve vectors or any other number of vectors to represent the user's journey. The number of vectors included within the embedding is a function of the different types of data sources available and the amount of data provided (history).

The set of embeddings 118 for one or more users is compatible for utilization by a plurality of prediction models 122. In other words, the same embedding may be used by multiple different prediction models to generate predictions 124 and/or recommendations 126 customized for one or more users based on the set of embeddings.

The self-supervised activity sequencing model 102 in this example is a self-supervised, deep learning model. Self-supervised models are trained using unlabeled training data. In this example, the unlabeled training data includes unlabeled, historical activity data. The activity data is analyzed by the encoder to generate the set of embeddings 118. The decoder 106 re-creates the original input. Any errors in the recreated input activity data are backpropagated to adjust the weights of the network. The regenerated activity data is compared with the originally input training data (historical activity data). Errors in the regenerated activity data (portions of regenerated activity data that does not match the input training data) are identified and used to adjust weights applied to the inputs and/or algorithms used by the encoder to generate the set of embeddings. This enables training of the self-supervised activity sequencing model 102 without labeled training data.

Thus, in some examples, the encoder 104 takes in sequential feature inputs like transaction data, subscription data, support calls, etc. It combines the sequential feature inputs with non-sequential features, such as demographic data (age, gender, residence—city, state). The demographic (non-sequential) data gets combined with sequential data to generate an embedding. The embedding is a representation of a specific human user in a fixed number of decimal values. The output of the encoder is dimensional sequential feature vectors and non-sequential feature vectors into a compressed fixed length embedding.

In some examples, the self-supervised activity sequencing model 102 operates with little to no input from human users. The self-supervised activity sequencing model 102 uses auto-encoder frameworks to generate parts of the input and do multi-task optimizations on different parts of the input. The encoder-decoder frameworks utilize sequential models with attention and combined with non-sequential data (e.g. profile data) in linear layers in the encoder. The generated embeddings can be used as input to other models and fine-tuned using DL techniques.

Deep learning is an attractive option to build out of the box ML models, because it removes the need for extensive feature engineering and puts the burden on a good pre-trained neural architecture underneath. Moreover, there is a natural overlap in prediction problems—the same customer activities and their order over time defines the outcome of most of these tasks, be it customer churn, lifetime value or purchase propensity.

The self-supervised activity sequencing model 102 encapsulates semantic information about customers and their activity patterns and behaviors, in a way that does not require much human input and is common across prediction problems. In some examples, the embeddings provide encoding used for multiple customer activity-based prediction problems.

The embeddings can be used for a variety of different applications. They can simply be used as inputs to other models, they can be fine-tuned using deep learning techniques. The embeddings can serve as the base horizontal layer for a lot of different types of models. In some examples, the self-supervised activity sequencing model 102 can be used on scenarios like predicting customer churn, lifetime value, recommending products for customers and for segmenting customers based on activity and behavior. These scalable embeddings when used for such applications can match or, in some cases, exceed custom and non-scalable machine learning models.

Figure 2:
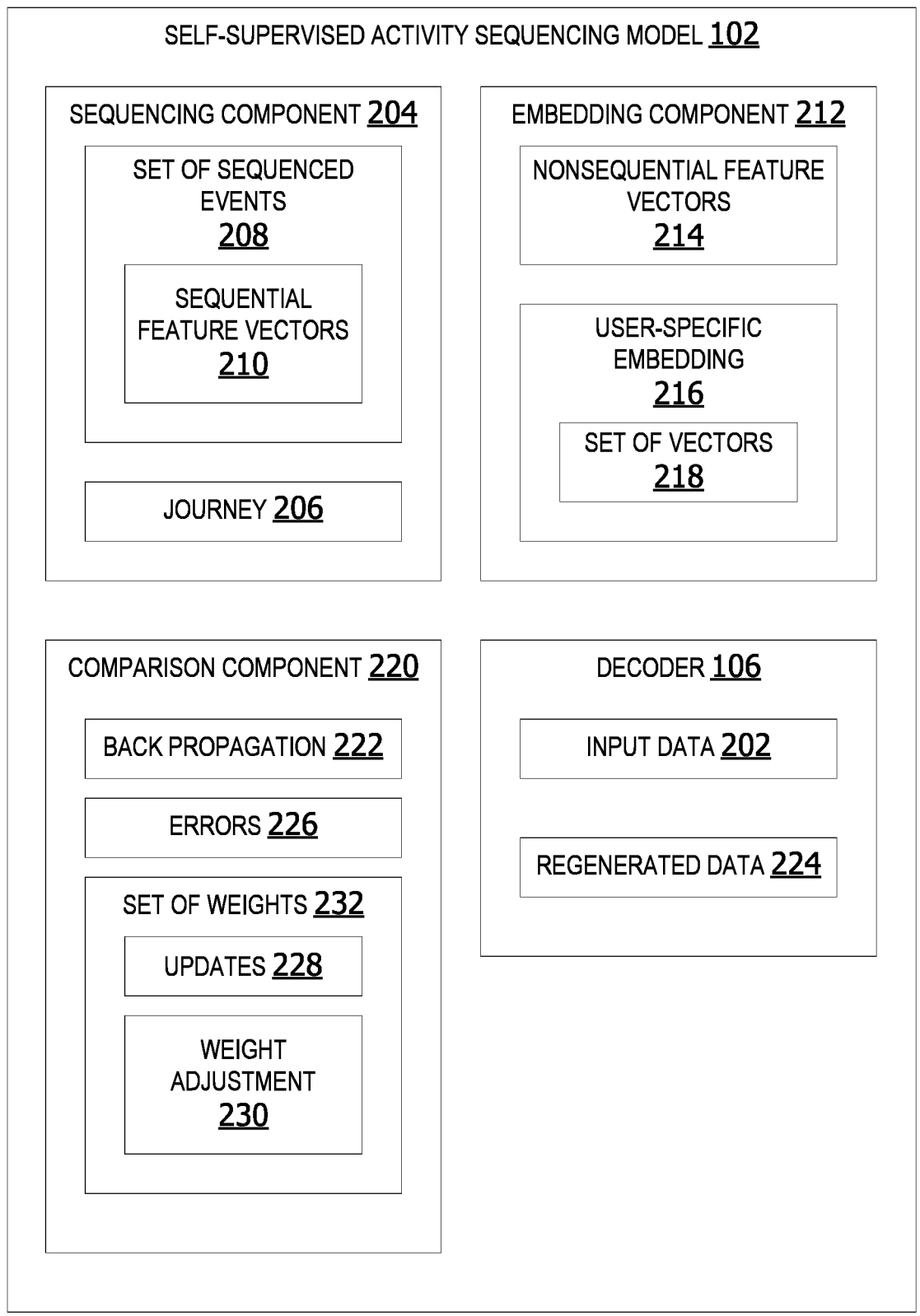
FIG. 2 is an exemplary block diagram illustrating an encoder-decoder framework for training a self-supervised activity sequencing model for generating embeddings.

FIG. 2 is an exemplary block diagram illustrating an encoder-decoder framework for training a self-supervised activity sequencing model 102 for generating embeddings. In some examples, the encoder includes a sequencing component 204 which generates a user-specific journey 206 based on a set of sequenced events 208. The set of sequenced events 208 are represented in a set of sequential feature vectors 210.

An embedding component 212 in some examples combines the sequential feature vectors 210 with non-sequential feature vectors 214 to create a user-specific embedding 216 based on the journey 206.

In this manner the system translates the user-specific journey into a set of numbers or values. The embeddings generated for multiple users have properties. If two human users (customers) have similar journeys and similar demographics, they will have similar embeddings (closer). The non-sequential feature vectors 214 includes a set of vectors representing non-sequential, user-specific data, such as, but not limited to, demographic data or other user profile data.

The user-specific embedding 216 is an embedding including a set of one or more vectors 218 representing a set of events for a selected user, such as, but not limited to, an embedding in the set of embeddings 118 in FIG. 1. In this example, the user-specific embedding is generated using unlabeled, input data 202. The input data 202 includes historical activity data as unlabeled training data for the model. After the embedding is generated by the model, the decoder creates regenerated data 224. The regenerated data is a re-creation or attempted recreation of the original input data 202.

A comparison component 220 performs back propagation 222 on the user-specific embedding. During back propagation, the comparison component 220 identifies any errors 226 in the regenerated data 224. The errors 226 include any mistakes or mismatches between the input data 202 and the regenerated data 224. The errors 226 are used to makes updates 228 to the model algorithms.

In some examples, the errors 226 are used to makes updates or weight adjustment 230 to the set of one or more weights 232. The set of weights 232 are applied to the inputs and/or connections within the neural network used to generate the embeddings. This process is continued iteratively until the encoder/decoder network is able to re-generate both sequential and non-sequential features with a certain degree of accuracy. The set of weights 232 are initialized using pre-set or default values prior to training or fine-tuning.

Figure 3:
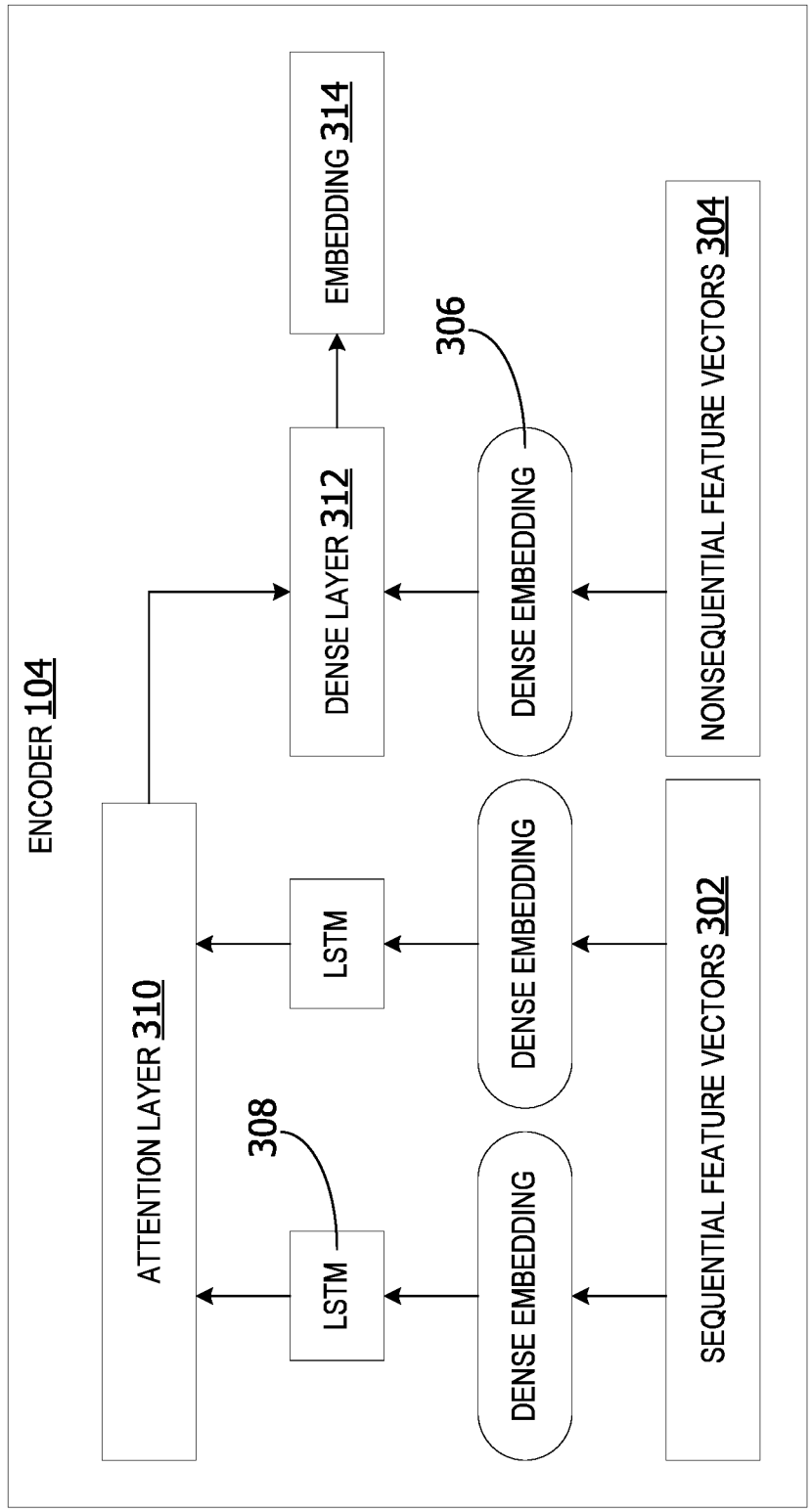
FIG. 3 is an exemplary block diagram illustrating a self-supervised activity sequencing model including an encoder for generating embeddings.

FIG. 3 is an exemplary block diagram illustrating a self-supervised activity sequencing model 102 including an encoder 104 for generating embeddings. The encoder 104 combines sequential feature vectors 302 and non-sequential vectors 304 data at a dense embedding layer 306.

In some non-limiting examples, the encoder 104 includes a long short-term memory (308) artificial neural network architecture and an attention layer 310. However, the examples are not limited to an LSTM 308 or attention layer 310 for generating the embeddings. In another example, the encoder includes a dense layer 312 for modeling mathematical functions to generate the embedding 314.

Figure 4:
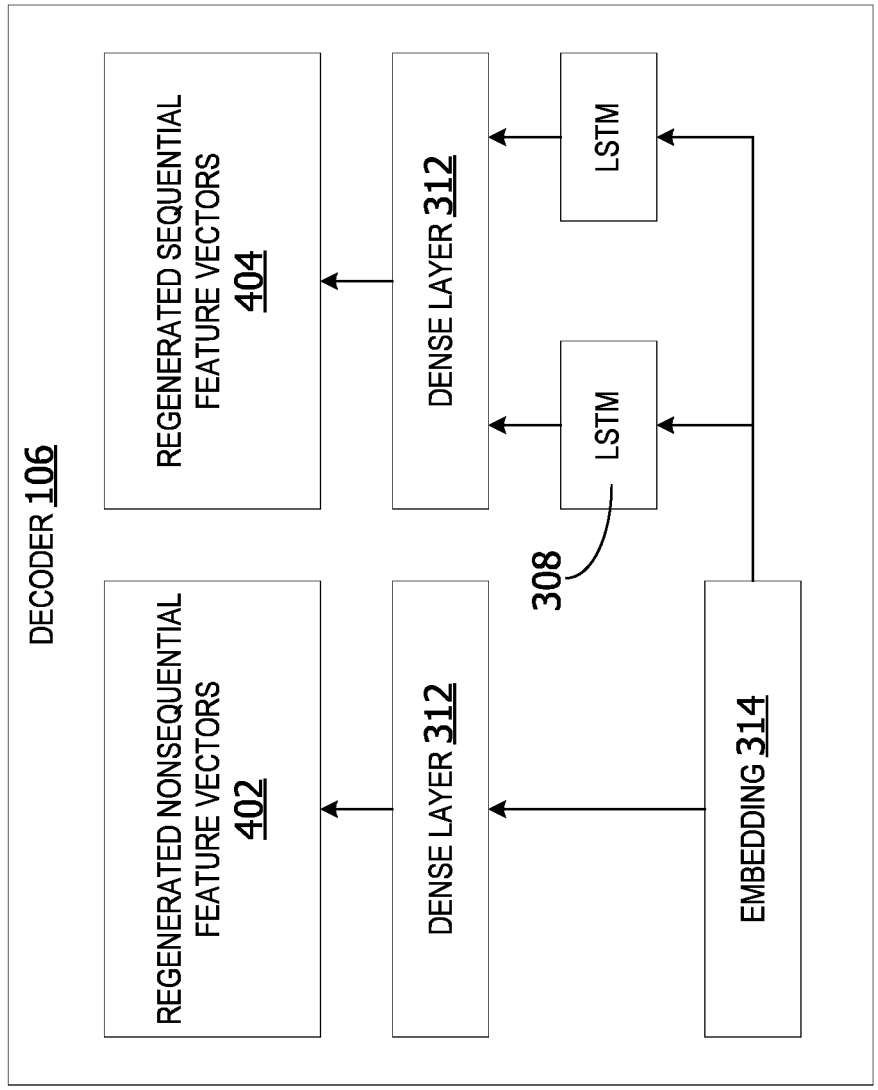
FIG. 4 is an exemplary block diagram illustrating a decoder associated with a self-supervised activity sequencing model.

FIG. 4 is an exemplary block diagram illustrating a decoder 106 associated with a self-supervised activity sequencing model 102. The decoder 106 performs back propagation to create regenerated nonsequential feature vectors 402 and regenerated sequential feature vectors 404 for comparison with the original input data. Any errors in the regenerated data is used to adjust the weights used to train the model.

Figure 5:
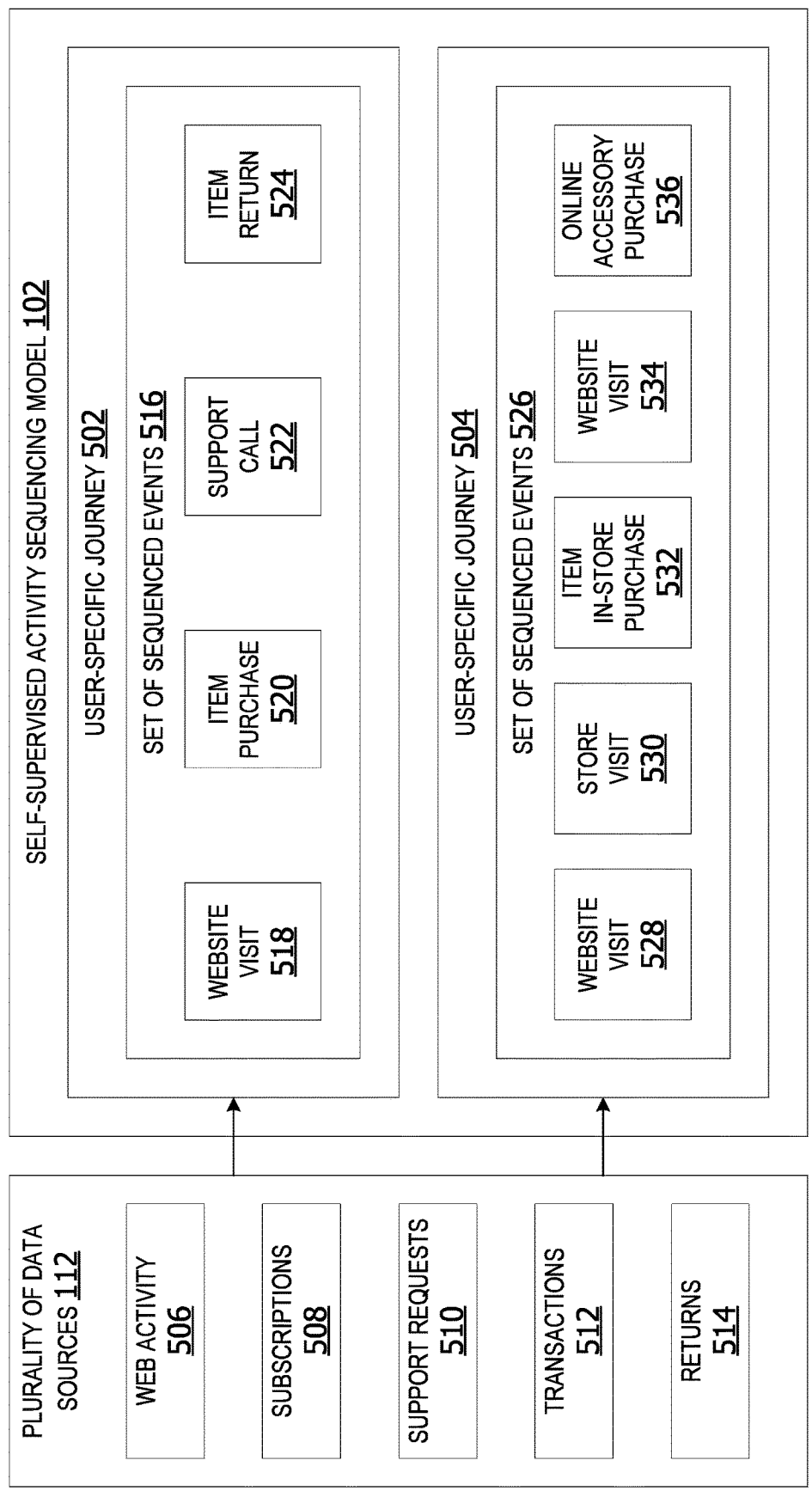
FIG. 5 is an exemplary block diagram illustrating a self-supervised activity sequencing model generating user-specific journeys based on activity data from a plurality of data sources.

FIG. 5 is an exemplary block diagram illustrating a self-supervised activity sequencing model 102 generating user-specific journeys based on activity data from a plurality of data sources. The plurality of data sources 112 includes user-related data which is ordered in time or which can be ordered in time. In some examples, the activity data includes a time stamp. A time stamp is a type of time indicator. In some examples, the activity data in the plurality of data sources 112 includes data such as, but not limited to, web activity 506, subscriptions 508, support requests 510, transactions 512 and/or returns 514.

In some examples, the web activity 506 includes web search activity (web browsing), e-commerce activity, online purchases, etc. The subscriptions 508 include subscription data associated with memberships, subscriptions to streaming services, etc. The support requests 510 includes customer support requests associated with goods or services. Customer support requests can include phone calls to a support line, emails, as well chat support lines or other online customer support lines. Returns 514 in other examples refers to returning of a purchased product. A return can include an in-store return and/or an online return.

A user-specific journey 502 for a first user includes a set of sequenced events 516. The set of sequenced events 516 is obtained from the activity data in the plurality of data sources 112. The events taken from different tables are placed into a unified sequence. In this non-limiting example, the set of sequenced events 516 in the user-specific journey 502 includes a website visit 518 which is followed by an item purchase 520, a support call 522 and then an item return 524. This set of sequenced events represents the activities performed by a user sequenced in a chronological order.

Another user-specific journey 504 for a second user includes a different set of sequenced events 526. In this non-limiting example, the user-specific journey 504 includes a website visit 528, an in-store visit 530 followed by an in-store item purchase 532, another website visit 534 and then an online accessory purchase 536. The online accessory purchase can include the purchase of an accessory for the item purchased at the item in-store purchase 532.

Figure 6:
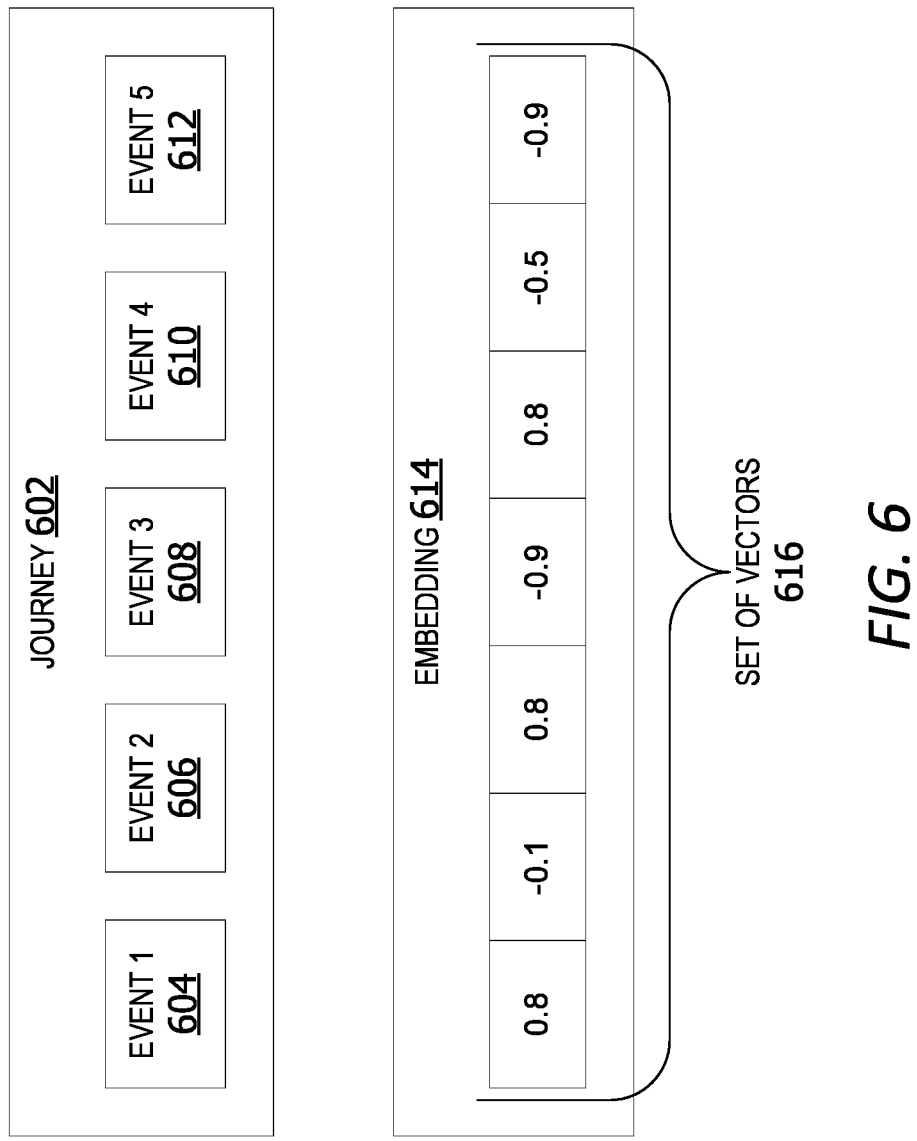
FIG. 6 is an exemplary block diagram illustrating an embedding representing a set of events in a user-specific journey.

FIG. 6 is an exemplary block diagram illustrating an embedding representing a set of events in a user-specific journey. In this non-limiting example, the user-specific journey 602 includes a set of events placed into a chronological order. In this example, a first event 604 which occurred first in time is placed first in the journey. The second event 606 is placed second. A third event 608 which occurred after the second event 606 and before the fourth event 610. The fifth event 612 which occurred after the other four events is placed last in the journey 602.

Sequences exist naturally in Enterprise tabular data as activities and events. For example, web activity data can include the following event sequence: home page→search-→form-fill. Another non-limiting example of a journey including the following e-commerce related events: item visit→add to cart→buy. A user-specific journey generated at least in part based on subscription data associated with a user includes the following sequence of events: subscription start→usage→subscription end. Another example of event data can include the following:

Event=[Type of WebVisit(View,AddToCart,Buy),
Type of Product(Product ID),TimeStamp].

The system generates an embedding 614 based on the sequence of events in the journey 602. The embedding 614 includes a set of vectors 616 representing the set of events in the user-specific journey. In some examples, the system performs customer activity sequence prediction and recommendation (CASPR) embedding via self-supervised learning enabling automatically learnt compressed representation of sequence with LSTM Auto-encoders. The system generating CASPR embeddings can improve many CDP prediction problems where human activities and the sequence of those activities matter.

The embedding 614 vector values can vary within a range from negative one (−1.0) to one (1.0). For example, a vector can have a value of 0.8, 0.1, 0.5 or 0.3. Other exemplary vector values as shown, can include any fraction between one and negative one, such as, but not limited to, −0.5, −0.9, −0.1.

Figure 7:
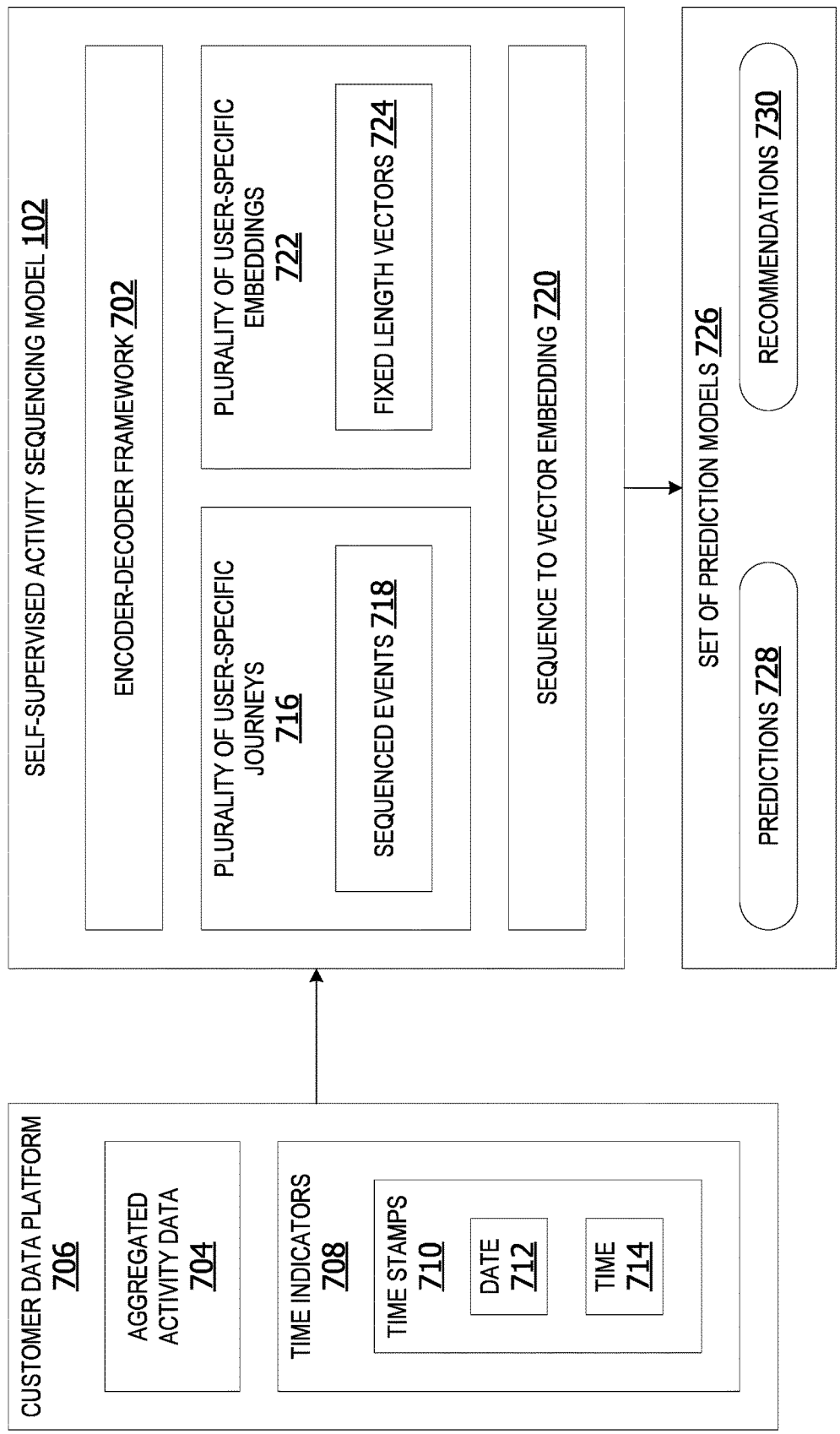
FIG. 7 is an exemplary block diagram illustrating a self-supervised activity sequencing model generating embeddings for use by a set of prediction models based on data obtained from a customer data platform.

FIG. 7 is an exemplary block diagram illustrating a self-supervised activity sequencing model 102 generating embeddings for use by a set of prediction models based on data obtained from a customer data platform. In some examples, the self-supervised activity sequencing model 102 has an encoder-decoder framework 702.

A CDP 706 in some examples unifies activity data from the plurality of data sources into aggregated activity data 704 including one or more-time indicators 708. A CDP combines data stored across different platforms. A CDP 706 can bring together data about human users are fragmented in different data tables. The role of CDP 706 brings together fragmented data sources into a unified activity timeline of customer's journey (table or timeline).

Time indicators 708 can include, for example but without limitation, one or more timestamps 710. A time stamp can include a date 712 and/or a time 714 at which a given event occurs. The time indicators 708 can be used to place events into an order.

The self-supervised activity sequencing model 102 analyzes the aggregated activity data 704 to generate a plurality of user-specific journeys 716 for a plurality of users. Each user-specific journey includes a set of sequenced events 718.

The self-supervised activity sequencing model 102 performs sequence to vector embedding 720 on each user-specific journey to generate a plurality of user-specific embeddings 722. Each user-specific embedding is a fixed-length vector which can be used by one or more models in the set of prediction models 726 for generating one or more predictions 728 and/or one or more recommendations 730.

Figure 8:
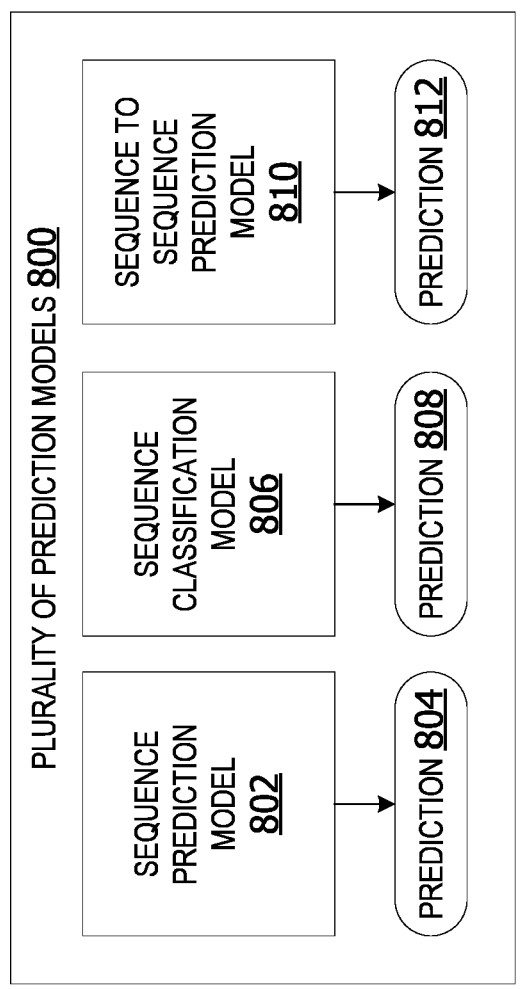
FIG. 8 is an exemplary block diagram illustrating a plurality of prediction models generating predictions based on embeddings.

FIG. 8 is an exemplary block diagram illustrating a plurality of prediction models 800 generating predictions based on embeddings. In some examples, the model utilizes sequence learning, including a generic deep learning formulation for events and activities that have an order over time.

In some examples, a sequence prediction model 802 generates a prediction 804 based on a plurality of embeddings representing sequenced human activities for a plurality of users. The prediction can include time series prediction and/or product recommendations. In other examples, a sequence classification model 806 in the plurality of prediction models generates a prediction 808. The prediction 808 can include, without limitation, sentiment analysis prediction, lead/opportunity scoring prediction, buying propensity prediction, and/or churn prediction.

A sequence to sequence prediction model 810 in some examples generates a prediction 812. The prediction 812 can include, for example but without limitation, a text summarization, language translation and/or journey next steps prediction.

Figure 9:
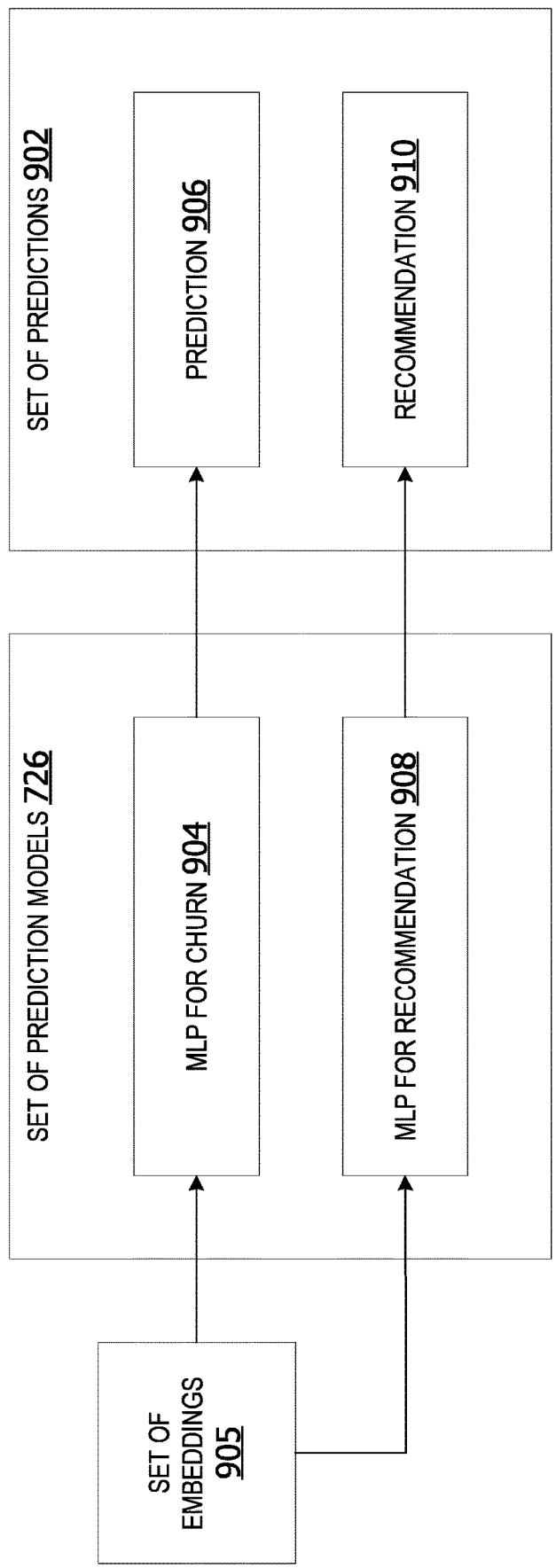
FIG. 9 is an exemplary block diagram illustrating a set of prediction models generating a set of predictions based on at least one embedding.

FIG. 9 is an exemplary block diagram illustrating a set of prediction models 726 generating a set of predictions 902 based on at least one embedding. In some examples, the set of prediction models 726 includes a machine learning prediction (MLP) model for predicting churn 904. The MLP model for churn 904 generates a prediction 906 using the set of embeddings 905. The prediction 906 predicts whether a user is likely to churn.

In other examples, the set of prediction models 726 includes an MLP model for recommendation 908. The MLP model for recommendation 908 generates a recommendation 910 based on the same input set of embeddings 905. The recommendation 910 can include a product recommendation, a discount/promotional recommendation, etc.

Figure 10:
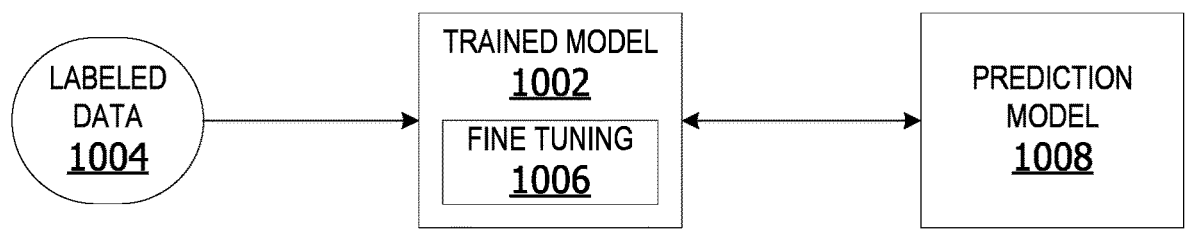
FIG. 10 is an exemplary block diagram illustrating fine-tuning a self-supervised activity sequencing model for generating fine-tuned predictions.

FIG. 10 is an exemplary block diagram illustrating fine-tuning a self-supervised activity sequencing model for generating fine-tuned predictions. In some examples, a trained model 1002 is fine-tuned using labeled data 1004. The trained model 1002 is a trained self-supervised activity sequencing model. The fine-tuning 1006 permits the trained model weights to be adjusted to fine-tune embeddings generated by the trained model 1002 for a specific prediction model 1008, rather than generating embeddings which can be used by a variety of models. In other words, once the model is fine-tuned using the labeled data, the fine-tuned model generates embeddings which are only suitable for use by a specific prediction model. The self-supervised activity sequencing models which are trained using unlabeled data generate embeddings which are suitable for use by a plurality of different prediction models.

In one example, the model is fine-tuned to generate embeddings customized for a churn prediction model. In these examples, the input activity data for users is weighted to indicate which types of activity data are more valuable/accurate for generating embeddings for predicting churn.

In an example scenario, labeled sequence data is fed into the trained neural network to generate embeddings and generate predictions for churn. The generated embeddings are compared with the labeled data to back propagate errors for predicting churn and fine tune the network to generate more accurate/useful embeddings for churn. Likewise, if the system has labeled data associated with embeddings used for generating product recommendation, the system can create a separate fine-tuned neural network which work very well for generating product recommendations. Both of these fine-tuned neural networks can be created by fine-tuning the same base model.

In other examples, the model is fine-tuned to generate customized embeddings for a product recommendation prediction model. In these examples, the input activity data and ML model algorithms are weighted to indicate which activity data for users is more relevant for generating product recommendations. In other words, there are weights associated with connections in the neural network tuned to generate embeddings which are optimized for specific prediction and recommendation tasks.

Figure 11:
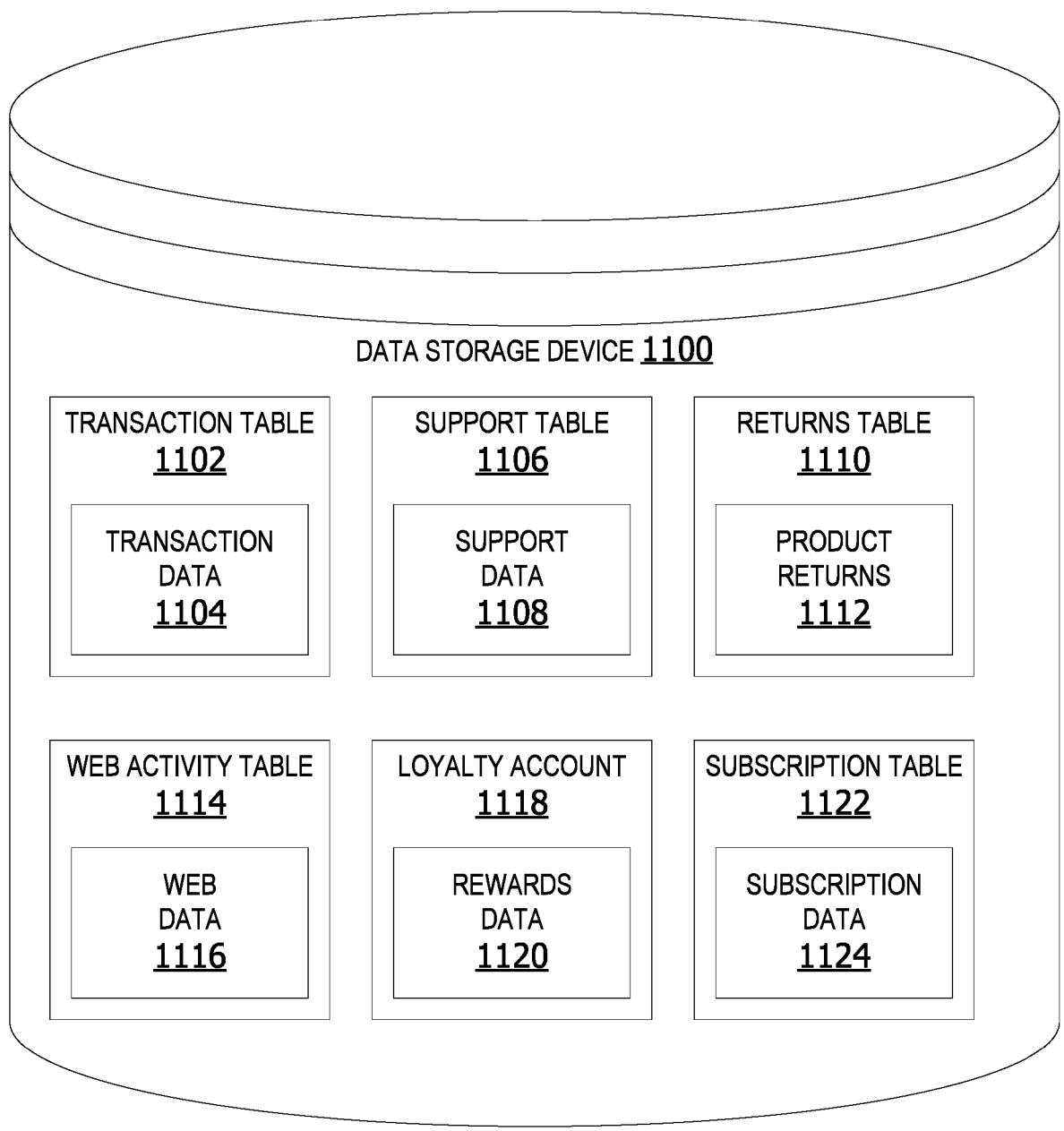
FIG. 11 is an exemplary block diagram illustrating a data storage device storing a plurality of tables of data.

FIG. 11 is an exemplary block diagram illustrating a data storage device 1100 storing a plurality of tables of data. The plurality of tables can be implemented as any type of tables, such as, but not limited to, SQL tables, relational tables, or any other type of data tables.

The data storage device 1100 can include one or more different types of data storage devices, such as, for example, one or more rotating disks drives, one or more solid state drives (SSDs), and/or any other type of data storage device. The data storage device 1100 in some non-limiting examples includes a redundant array of independent disks (RAID) array. In other examples, the data storage device 1100 includes a database.

The plurality of tables provides activity data from a plurality of sources. The plurality of tables can include, in some examples, a transaction table 1102 including transaction data 1104 describing transactions. A support table 1106 stores support data 1108 describing customer support requests associated with products or services. A returns table 1110 includes product returns 1112 data describing product returns and/or exchanges.

In other examples, web activity table 1114 stores web data 1116 describing online events, such as, but not limited to, online purchases, visits to websites, etc. A loyalty account 1118 includes customer rewards data 1120 in some examples. In other examples, a subscription table 1122 includes subscription data 1124 describing user subscriptions to services.

Figure 12:
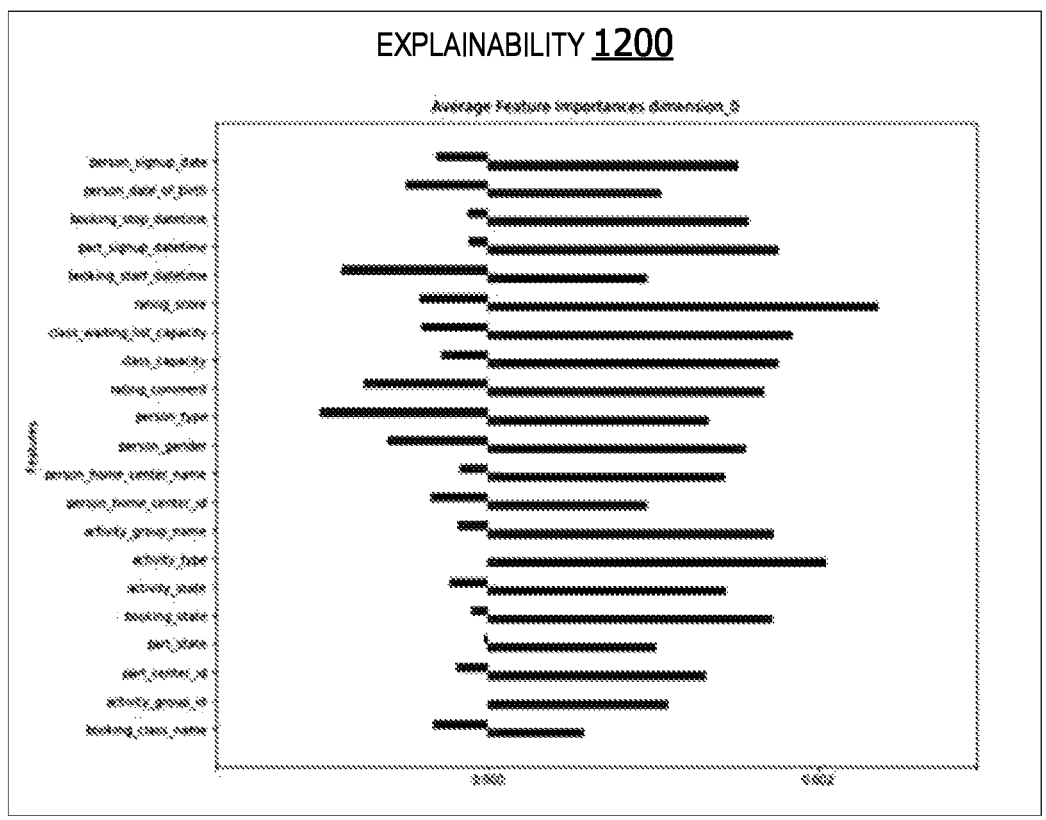
FIG. 12 is an exemplary graph 1200 illustrating explainability data.

FIG. 12 is an exemplary graph 1200 illustrating explainability data. To add wider transparency and build trust in the models, the system can optionally generate explanations behind the different dimensions of the embeddings, which can be used to explain the predictions and applications that the embeddings are used to generate. This sheds light on what is traditionally a black-box setup with deep learning. In some examples, to generate these explanations, explainers such as DeepLift and Integrated Gradients are provided.

In this example, explainability is a separate output from the embedding, but output alongside embeddings. The explainability data is provided as the graph 1200. However, in other examples, the explainability data may be output in other formats, such as, but not limited to, charts, tables, line graphs, bar graphs, diagrams, or any other data format indicating vectors in embeddings contributing to predictions and recommendations using those embeddings.

Figure 13:
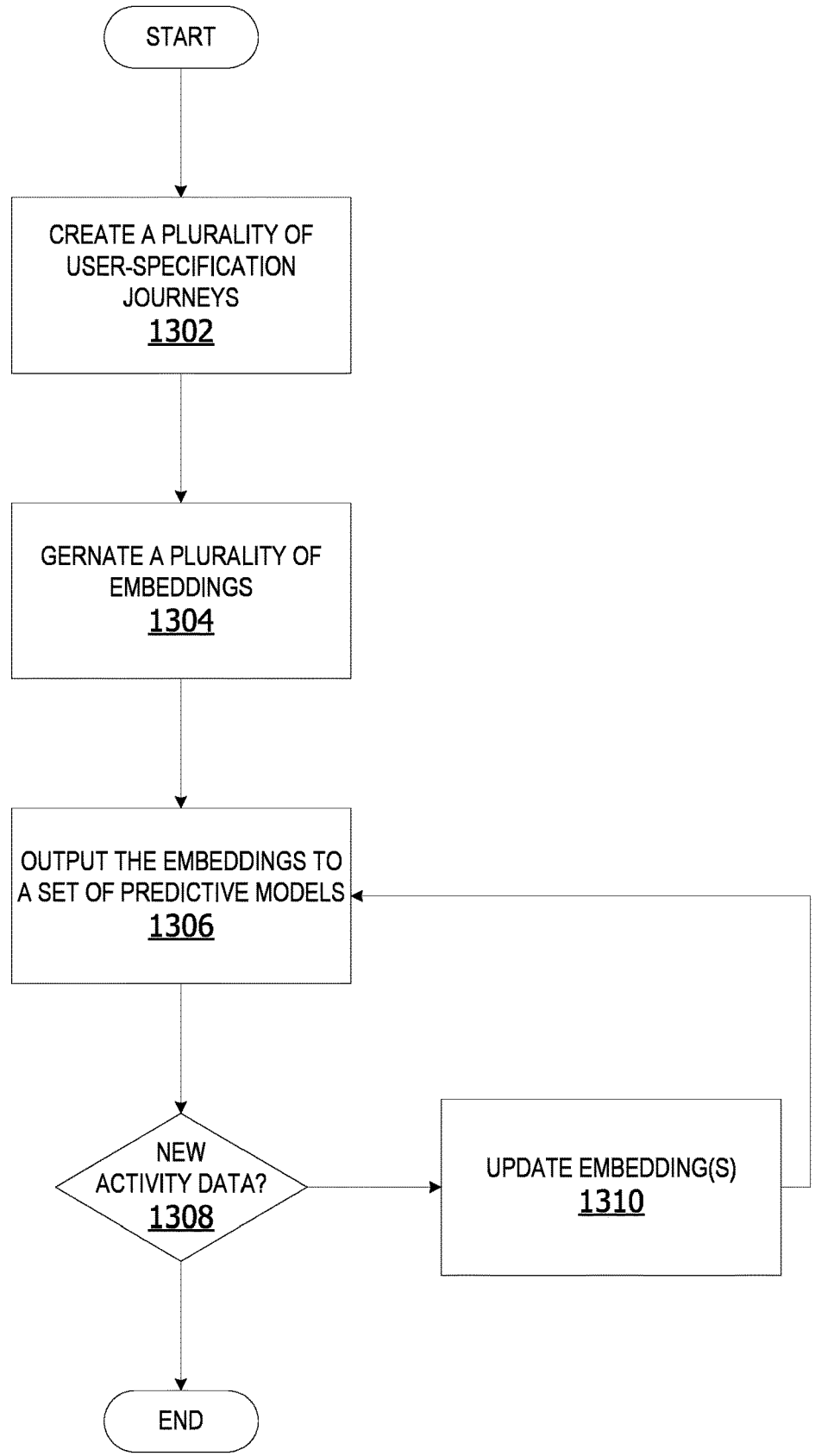
FIG. 13 is an exemplary flow chart illustrating operation of the computing device to generate embeddings representing user-specific journeys.

FIG. 13 is an exemplary flow chart illustrating operation of the computing device to generate embeddings representing user-specific journeys. The process shown in FIG. 13 is performed by a self-supervised activity sequencing model, executing on a computing device, such as the computing device computing device 1600 of FIG. 16.

The process begins by creating a plurality of user-specific journeys at 1302. A plurality of embeddings is generated based on the user-specific journeys at 1304. The embeddings are output to a set of predictive models at 1306. A determination is made whether new activity data is received at 1308. If yes, one or more embeddings are updated at 1310 based on the new activity data. The process continues iteratively executing operations 1302 through 1308 until no new activity data is received. The process terminates thereafter.

While the operations illustrated in FIG. 13 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 13. Computer-readable storage media may also be referred to as computer-readable medium, computer-readable media and/or computer-readable storage medium.

Figure 14:
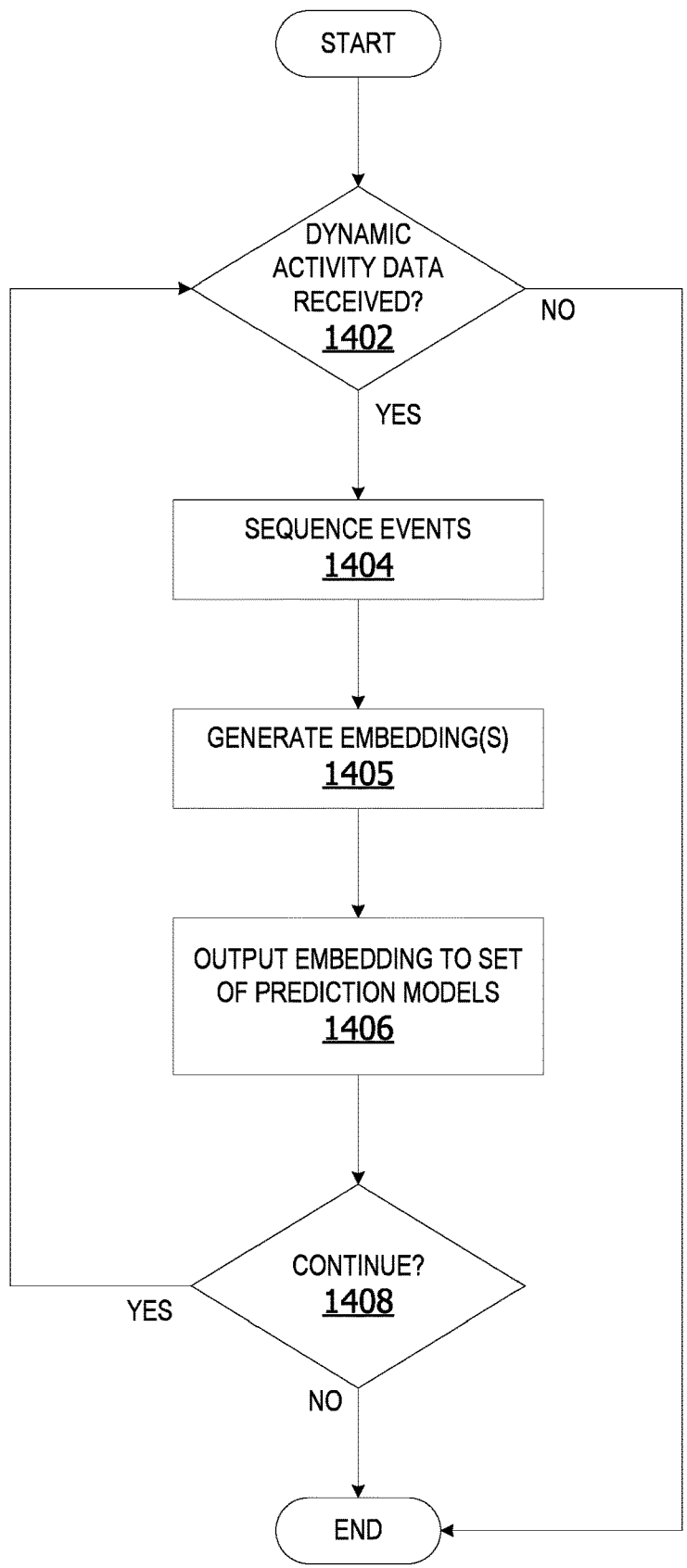
FIG. 14 is an exemplary flow chart illustrating operation of the computing device to generate embeddings representing human activity for use by prediction models to generate predictions and recommendations.

FIG. 14 is an exemplary flow chart illustrating operation of the computing device to generate embeddings representing human activity for use by prediction models to generate predictions and recommendations. The process shown in FIG. 14 is performed by a self-supervised activity sequencing model, executing on a computing device, such as the computing device computing device 1600 of FIG. 16.

The process begins by determining whether dynamic activity data is received at 1402. If yes, events described in the activity data are sequenced at 1404. In some examples, the sequenced data is referred to as a user-specific journey. Embeddings are generated at 1405 based on the sequenced events. Embeddings are output to a set of prediction models at 1406. A determination is made to determine whether to continue at 1408. If yes, the process iteratively executes operations 1402 through 1408. The process terminates thereafter.

While the operations illustrated in FIG. 14 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 14.

Figure 15:
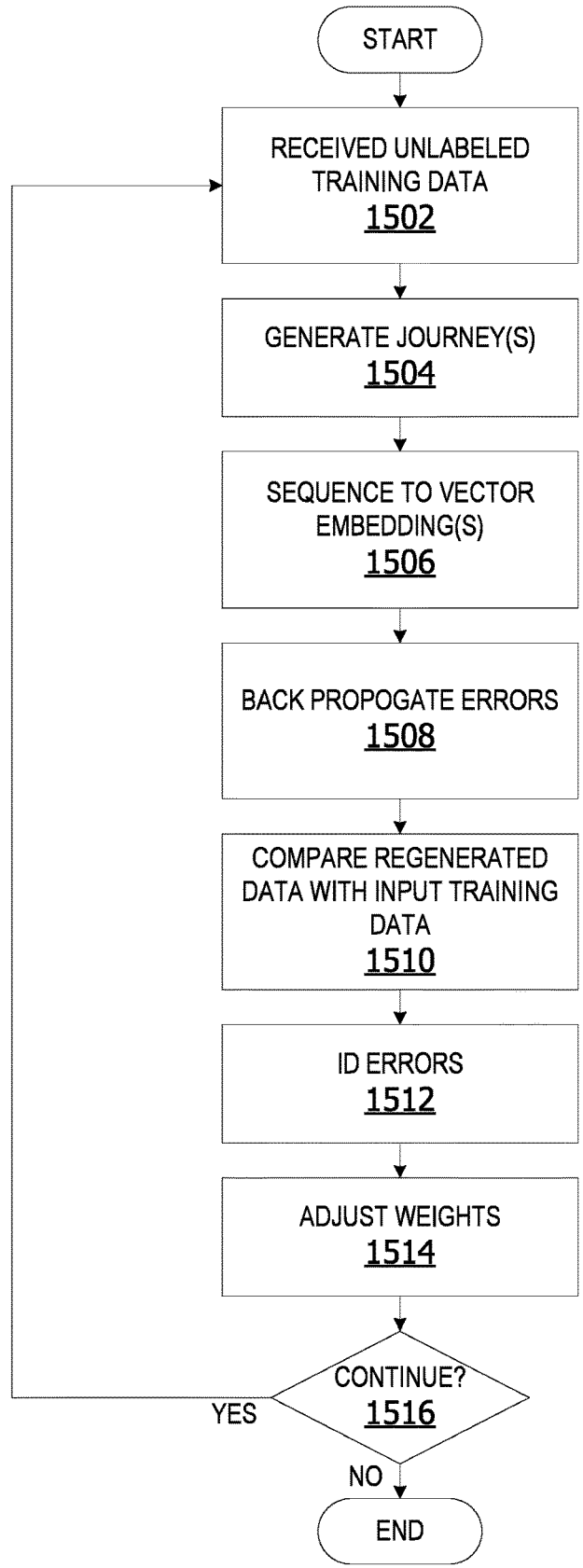
FIG. 15 is an exemplary flow chart illustrating operation of the computing device to train a neural network deep learning model for generating embeddings representing human activity.

FIG. 15 is an exemplary flow chart illustrating operation of the computing device to train a neural network deep learning model for generating embeddings representing human activity. The process shown in FIG. 15 is performed by a self-supervised activity sequencing model, executing on a computing device, such as the computing device computing device 1600 of FIG. 16.

The process begins by receiving unlabeled training data at 1502. Journey(s) are generated at 1504. Each journey is a user-specific journey including sequenced events. A sequence to vector embedding is performed at 1506 to generate embedding(s). The model back propagates errors at 1508. During back propagation, the regenerated data is compared with the input training data at 1510. Any error(s) in the regenerated data are identified at 1512. A set of weights are adjusted at 1514 based on the weights. A determination is made whether to continue at 1516. If yes, the process iteratively executes operations 1502 through 1515 until a determination is made not to continue. A decision may be made to not continue when the encoder/ decoder network is able to re-generate both sequential and non-sequential features with a certain degree of accuracy. The process terminates thereafter.

While the operations illustrated in FIG. 15 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 15.

Additional Examples

Some aspects and examples disclosed herein are directed to a system, method and/or computer executable instructions for generating customer activity sequence predictions and recommendations comprising: a processor; and a computer-readable medium storing instructions that are operative upon execution by the processor to: generate at least one user-specific journey based on unlabeled activity data describing human activities associated with at least one user; create at least one embedding based on sequential feature vectors in the user-specific journey, an embedding comprising a set of fixed length vectors representing sequential human activity of the user for generating user-specific activity predictions and recommendations by a plurality of prediction models; and analyze the at least one embedding to generate a set of predictions associated with the at least one user. The set of predictions comprising at least one prediction or recommendation.

Additional aspects and examples disclosed herein are directed to a system, method, or computer executable instructions for generating embeddings representing sequential human activity. A plurality of data sources associated with at least one data storage device store unlabeled activity data associated with a plurality of users and a set of time indicators associated with the unlabeled activity data, the activity data describing events having order over time. A time indicator in the set of time indicators may be implemented as any device or component for indicating time, such as, but not limited to, a time stamp. A sequencing component creates a plurality of user-specific journeys based on the unlabeled activity data. A user-specific journey in the plurality of user-specific journeys comprising a set of sequential feature vectors corresponding to a set of events associated with selected user placed into a sequence in accordance with the set of time indicators. An embedding component generates a plurality of embeddings based on sequential feature vectors in the plurality of user-specific journeys and non-sequential feature vectors associated with the plurality of users. An embedding in the plurality of embeddings comprising a set of fixed length vectors representing sequential human activity of the selected user. The plurality of embeddings is output to a set of ML prediction models for generating user-specific activity predictions and recommendations based on the activity data associated with the plurality of users.

Additional aspects and examples disclosed herein are directed to a system, method and/or one or more computer storage devices having computer-executable instructions stored thereon for creating a plurality of user-specific journeys based on unlabeled activity data obtained from a plurality of data sources, a user-specific journey in the plurality of user-specific journeys comprising a set of sequential feature vectors corresponding to a set of events associated with selected user placed into a sequence in accordance with the set of time indicators; generating a plurality of embeddings based on sequential feature vectors in the plurality of user-specific journeys and non-sequential feature vectors associated with the plurality of users, an embedding in the plurality of embeddings comprising a set of fixed length vectors representing sequential human activity of the selected user; and outputting the plurality of embeddings to a set of ML prediction models for generating user-specific activity predictions and recommendations based on the activity data associated with the plurality of users.

In an exemplary scenario, the system generates self-supervised embeddings for customer segmentation tasks. Customers can be segmented into various groups/segments based on embeddings, such as, but not limited to, new customers, returning customers, customers likely to return products, etc. Segmentation may be done using customer metrics to segment customer base into different populations which are not activity dependent. In one example, unsupervised clustering of all customer embeddings is performed to identify users close to each other on the dimensional space. This clustering enables identification of segments of users having similar features/characteristics, properties, etc.

In other examples, an embedding is generated for each human user (customer) in a group or population. If a group includes 100 customers, the system generates 100 sets of embeddings for the 100 customers. In another example if there are 100,000 customers, the system creates 100,000 embeddings. A unique embedding is generated for each embedding. Each embedding in the plurality of 100 embeddings is informed/influenced by every other embedding in the group such that human users having similar activities and similar demographics have similar embeddings.

In some examples, embeddings represent human user features and activities. Embeddings can include a numerical value indicating when the customer last visited a store or made a purchase. The embeddings remove need to manually generate customer features. The decimal numbers within the embeddings incorporate all the available information about the human user available from the plurality of sources to remove the need for featurization.

In an example scenario, some dimensions of embeddings capture the fact that this customer has recently not purchased anything from a service. When a model uses the embedding to predict churn, the dimensions indicating lack of purchase informs the prediction that the customer is likely to churn.

In still other examples, explainability provides explanations as to which dimensions/values contributed to which predictions/recommendations. In one example, explainability may indicate that if the embedding generated by the model indicates the first-dimension value is greater than 0.8, the customer is likely to churn. This helps build user trust in the model. The system uses embeddings to generate predictions. The system provides explainability to explain the predictions.

The embeddings are applicable to wide variety of end applications. In some examples, the embeddings are generated using Enterprise data. In other examples, the model can be trained and/or embeddings can be generated using at least a portion of publicly available data. In this manner, the system does not require large initial amounts of data to begin training.

In still other examples, the system models user-specific journeys using encoder and decoder framework. Self-supervised embeddings on customer journeys can be applied to end applications. The activity data is sequenced into events of a journey the human user took to generate embeddings.

The system treats activities as sequence itself. Seeing the connected events in time that create a sequence enables the system to convert human activities into sequences of interconnected events (chain of events) that can be converted into a numeric form that machine can consume rather than treating the activities as isolated instances. This leads to improved predictions.

The system, in other examples, creates the journey from data obtained from multiple sources and puts the journey into sequence as an encoding. The system summarizes the journey as a mathematical form in the embedding. Thus, the system generates embeddings that is representing customer journey sequence from various data sources. CDP is meant to bring data sources together.

In another example scenario, the system can use data from health-care related sources. The system converts the data into sequenced activity data converted into numbers. The sequenced activities can include symptoms experienced on different days, meals eaten on each day, exercise on each day, etc. The resulting embeddings can be used to predict possible diagnosis, recommend treatments, predict treatment successes or side-effects, etc.

The system uses ML and weights to improve embeddings and predictions generated using the embeddings over time. In some examples, the system uses autoencoder frameworks during training using self-supervision to regenerate parts of the input and perform multi-task optimizations on different parts of the input without obtaining any input from customers or users. The encoder-decoder frameworks use sequential models with attention, which are combined with non-sequential data such as profile data, in linear layers in the encoder. This enables utilization of the self-supervised activity sequencing model 102 without customization (OOB), because users do not have to provide training labels for their data.

In another example scenario, if data indicates a customer subscription canceled led to loss of the customer, the system learns to use subscription cancellation data as an indication of churn. The subscription canceled database can then be used to predict which current customers may cancel in future months.

Alternatively, or in addition to the other examples described herein, examples include any combination of the following:

an encoder-decoder framework of the neural network providing a self-supervised activity sequencing model for generating the plurality of embeddings based on the human activity data obtained from the plurality of data sources, wherein the sequencing component and the embedding component are part of the self-supervised activity sequencing model;
  analyze, by an encoder component, unlabeled input data for training the self-supervised activity sequencing model, wherein the unlabeled input data comprises historical human activity data;
  generate, by the encoder component, an embedding representing sequenced human activity;
  generate, by a decoder component, regenerated data;
  perform back propagation by a comparison component, the back propagation including a comparison of the regenerated data with the input data to identify a set of errors;
  update a set of weights used to generate the embeddings based on the identified set of errors;
  receive, from a customer data platform, updated human activity data representing a set of new activities by a second user in the plurality of users in real-time;
  generate, by the sequencing component, an updated user-specific journey for the second user; and
  create, by the embedding component, an updated user-specific embedding for the second user, wherein the updated user-specific embedding comprises a set of fixed length embeddings representing human activities associated with the second user, including the set of new activities described in the updated activity data;
  generate explainability data associated with at least one embedding in the plurality of embeddings;
  wherein the embedding component comprises at least one long short-term memory (LSTM) artificial recurrent neural network architecture for generating the plurality of embeddings;
  fine-tune the embedding component using labeled input data to generate embeddings for a predictive model selected from the set of ML prediction models;
  analyzing, by an encoder component, input data for training the self-supervised activity sequencing model, wherein the input data comprises unlabeled historical human activity data;
  generating, by the encoder component, an embedding representing sequenced human activity;
  creating, by a decoder component, regenerated data based on the embedding(s);
  comparing, by a comparison component, the regenerated data with the input data to identify a set of errors;
  update a set of weights used to generate the embeddings based on the identified set of errors;
  receiving, from a customer data platform, updated human activity data representing a set of new activities by a second user in the plurality of users in real-time;
  generating, by the sequencing component, an updated user-specific journey for the second user;
  creating, by the embedding component, an updated user-specific embedding for the second user, wherein the updated user-specific embedding comprises a set of fixed length embeddings representing human activities associated with the second user, including the set of new activities described in the updated activity data;
  generating explainability data associated with at least one embedding in the plurality of embeddings;
  fine-tuning the embedding component using labeled input data to generate embeddings for a predictive model selected from the set of machine learning prediction models;
  analyzing at least one embedding by a predictive model to generate a customized product recommendation for a user;
  analyzing at least one embedding by a predictive model to generate a customer churn prediction;
  analyzing at least one embedding by a predictive model to generate a user-specific next steps journey prediction.

While the aspects of the disclosure have been described in terms of various examples with their associated operations, a person skilled in the art would appreciate that a combination of operations from any number of different examples is also within scope of the aspects of the disclosure.

Example Operating Environment

Figure 16:
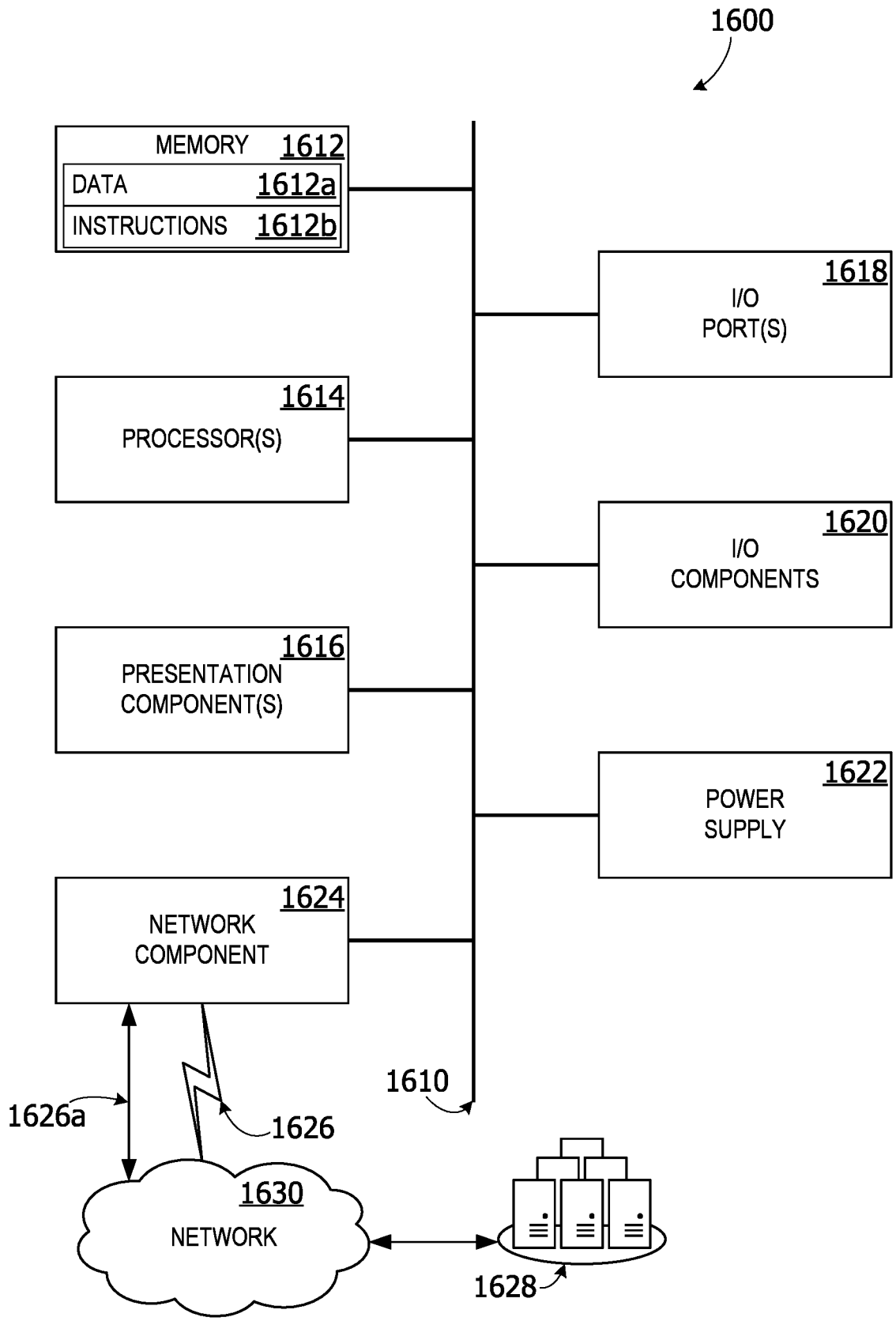
FIG. 16 is a block diagram of an example computing device 1600 for implementing aspects disclosed herein and is designated generally as computing device 1600.

FIG. 16 is a block diagram of an example computing device 1600 for implementing aspects disclosed herein and is designated generally as computing device 1600. Computing device 1600 is an example of a suitable computing environment and is not intended to suggest any limitation as to the scope of use or functionality of the examples disclosed herein. Neither should computing device 1600 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1600 includes a bus 1610 that directly or indirectly couples the following devices: computer-storage memory 1612, one or more processors 1614, one or more presentation components 1616, I/O ports 1618, I/O components 1620, a power supply 1622, and a network component 1624. While computing device 1600 is depicted as a seemingly single device, multiple computing devices 1600 may work together and share the depicted device resources. For example, memory 1612 may be distributed across multiple devices, and processor(s) 1614 may be housed with different devices.

Bus 1610 represents what may be one or more busses (such as an address bus, data bus, or a combination thereof). Although the various blocks of FIG. 16 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 16 and the references herein to a "computing device." Memory 1612 may take the form of the computer-storage media references below and operatively provide storage of computer-readable instructions, data structures, program modules and other data for computing device 1600. In some examples, memory 1612 stores one or more of an operating system, a universal application platform, or other program modules and program data. Memory 1612 is thus able to store and access data 1612a and instructions 1612b that are executable by processor 1614 and configured to carry out the various operations disclosed herein.

In some examples, memory 1612 includes computer-storage media in the form of volatile and/or nonvolatile memory, removable or non-removable memory, data disks in virtual environments, or a combination thereof. Memory 1612 may include any quantity of memory associated with or accessible by computing device 1600. Memory 1612 may be internal to computing device 1600 (as shown in FIG. 16), external to computing device 1600 (not shown), or both (not shown). Examples of memory 1612 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 1600. Additionally, or alternatively, memory 1612 may be distributed across multiple computing devices 1600, for example, in a virtualized environment in which instruction processing is carried out on multiple computing devices 1600. For the purposes of this disclosure, "computer storage media," "computer-storage memory," "memory," and "memory devices" are synonymous terms for computer-storage memory 1612, and none of these terms include carrier waves or propagating signaling.

Processor(s) 1614 may include any quantity of processing units that read data from various entities, such as memory 1612 or I/O components 1620 and may include CPUs and/or GPUs. Specifically, processor(s) 1614 are programmed to execute computer-executable instructions for implementing aspects of the disclosure. The instructions may be performed by the processor, by multiple processors within computing device 1600, or by a processor external to client computing device 1600. In some examples, processor(s) 1614 are programmed to execute instructions such as those illustrated in the in the accompanying drawings. Moreover, in some examples, processor(s) 1614 represent an implementation of analog techniques to perform the operations described herein. For example, the operations may be performed by an analog client computing device 1600 and/or a digital client computing device 1600. Presentation component(s) 1616 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1600, across a wired connection, or in other ways. I/O ports 1618 allow computing device 1600 to be logically coupled to other devices including I/O components 1620, some of which may be built in. Example I/O components 1620 include, for example but without limitation, a microphone, joystick, game pad, satellite dish, scanner, printer, wireless device, etc.

Computing device 1600 may operate in a networked environment via network component 1624 using logical connections to one or more remote computers. In some examples, network component 1624 includes a network interface card and/or computer-executable instructions (e.g., a driver) for operating the network interface card. Communication between computing device 1600 and other devices may occur using any protocol or mechanism over any wired or wireless connection. In some examples, network component 1624 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1624 communicates over wireless communication link 1626 and/or a wired communication link 1626a to a cloud resource 1628 across network 1630. Various different examples of communication links 1626 and 1626a include a wireless connection, a wired connection, and/or a dedicated link, and in some examples, at least a portion is routed through the internet.

Although described in connection with an example computing device 1600, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for generating embeddings representing sequential human activity, the system comprising:
    a plurality of data sources associated with at least one data storage device storing unlabeled activity data associated with a plurality of users and a set of time indicators, the unlabeled activity data describing human activity-related events having order over time, and unlabeled non-sequential data associated with the plurality of users, the unlabeled non-sequential data representing non-sequential user-specific data;
    a computer-readable medium storing instructions that are operative upon execution by a processor to:
        create a plurality of non-sequential feature vectors based on the unlabeled non-sequential data;
        create, by a sequencing component associated with a neural network, a plurality of user-specific journeys based on the unlabeled activity data, a user-specific journey in the plurality of user-specific journeys comprising a plurality of sequential feature vectors corresponding to a set of events associated with selected user placed into a sequence in accordance with the set of time indicators;
        combine, by an embedding component, the plurality of sequential feature vectors in the plurality of user-specific journeys and the plurality of non-sequential feature vectors; and
        generate, by the embedding component, a plurality of embeddings based on the combination of the plurality of sequential feature vectors in the plurality of user-specific journeys and the plurality of non-sequential feature vectors and a set of weights, an embedding in the plurality of embeddings comprising a set of fixed length vectors representing sequential human activity of the selected user, wherein the plurality of embeddings are suitable for utilization by a plurality of prediction models configured to generate user-specific activity predictions and recommendations;

generate, by a decoder component, a plurality of regenerated sequential feature vectors and a plurality of regenerated non-sequential feature vectors based on the plurality of embeddings;

compare, by a comparison component, the plurality of regenerated sequential feature vectors to the plurality of sequential feature vectors and the plurality of regenerated non-sequential feature vectors to the plurality of non-sequential feature vectors to identify a set of errors, wherein the set of errors are used to update the set of weights; and generate explainability data, the explainability data indicating contribution of a dimension value of the embedding to the user-specific predictions generated by the plurality of prediction models.

2. The system of claim 1, further comprises:
an encoder-decoder framework of the neural network providing a self-supervised activity sequencing model configured to generate the plurality of embeddings based on the unlabeled activity data obtained from the plurality of data sources, wherein the sequencing component and the embedding component are part of the self-supervised activity sequencing model.

3. The system of claim 2, wherein the instructions are further operative to:
analyze, by an encoder component, unlabeled input data for training the self-supervised activity sequencing model, wherein the unlabeled input data comprises historical human activity data;
generate, by the encoder component, an embedding representing sequenced human activity; and
perform, by the comparison component, back propagation.

4. The system of claim 1, wherein the selected user is a first user and wherein instructions are further operative to:
receive, from a customer data platform, updated activity data representing a set of new activities by a second user in the plurality of users in real-time;
generate, by the sequencing component, an updated user-specific journey for the second user; and
create, by the embedding component, an updated user-specific embedding for the second user, wherein the updated user-specific embedding comprises a set of fixed length embeddings representing human activities associated with the second user, including the set of new activities described in the updated activity data.

5. The system of claim 1,
wherein the explainability data is presented as a separate output from the plurality of embeddings.

6. The system of claim 1, wherein the embedding component comprises at least one long short-term memory (LSTM) artificial recurrent neural network architecture for generating the plurality of embeddings.

7. The system of claim 1, wherein the instructions are further operative to:
fine-tune the embedding component using labeled input data to generate embeddings for a predictive model selected from a set of machine learning (ML) prediction models.

8. A method of generating embeddings representing sequential human activity, the method comprising:
creating, by a sequencing component, a plurality of user-specific journeys based on unlabeled activity data obtained from a plurality of data sources, a user-specific journey in the plurality of user-specific journeys comprising a plurality of sequential feature vectors corresponding to a set of events associated with selected user placed into a sequence in accordance with a set of time indicators;

creating a plurality of non-sequential feature vectors based on unlabeled non-sequential data obtained from the plurality of data sources, the unlabeled non-sequential data representing non-sequential user-specific data;

combining, by an embedding component, the plurality of sequential feature vectors in the plurality of user-specific journeys and the plurality of non-sequential feature vectors;

generating, by the embedding component, a plurality of embeddings based on the combination of the plurality of sequential feature vectors in the plurality of user-specific journeys and the plurality of non-sequential feature vectors and a set of weights, an embedding in the plurality of embeddings comprising a set of fixed length vectors representing sequential human activity of the selected user;

outputting the plurality of embeddings to a set of machine learning prediction models for generating user-specific activity predictions and recommendations based on the unlabeled activity data and the unlabeled non-sequential data associated with a plurality of users;

generating, by a decoder component, a plurality of regenerated sequential feature vectors and a plurality of regenerated non-sequential feature vectors based on the plurality of embeddings;

comparing, by a comparison component, the plurality of regenerated sequential feature vectors to the plurality of sequential feature vectors and the plurality of regenerated non-sequential feature vectors to the plurality of non-sequential feature vectors to identify a set of errors, wherein the set of errors are used to update the set of weights; and generating explainability data, the explainability data indicating contribution of a dimension value of the embedding to the user-specific predictions generated by the plurality of prediction models.

9. The method of claim 8, further comprising:
analyzing, by an encoder component, input data for training a self-supervised activity sequencing model, wherein the input data comprises unlabeled historical human activity data;
generating, by the encoder component, an embedding representing sequenced human activity; and
performing, by the comparison component, back propagation.

10. The method of claim 8, further comprising:
receiving, from a customer data platform, updated activity data representing a set of new activities by a second user in the plurality of users in real-time;
generating, by the sequencing component, an updated user-specific journey for the second user; and
creating, by the embedding component, an updated user-specific embedding for the second user, wherein the updated user-specific embedding comprises a set of fixed length embeddings representing human activities associated with the second user, including the set of new activities described in the updated activity data.

11. The method of claim 8,
wherein the explainability data is presented as a separate output from the plurality of embeddings.

12. The method of claim 8, further comprising:
fine-tuning the embedding component using labeled input data to generate embeddings for a predictive model selected from the set of machine learning prediction models.

13. The method of claim 8, further comprising:
analyzing at least one embedding by a predictive model to generate a customized product recommendation for a user.

14. The method of claim 8, further comprising:
analyzing at least one embedding by a predictive model to generate a customer churn prediction.

15. The method of claim 8, further comprising:
analyzing at least one embedding by a predictive model to generate a user-specific next steps journey prediction.

16. One or more computer storage media having computer-executable instructions for generating embeddings representing sequential human activity that, upon execution by a processor, cause the processor to at least:
generating a plurality of user-specific journeys based on unlabeled activity data describing human activities associated with a plurality of users, a user-specific journey in the plurality of user-specific journeys comprising a plurality of sequential feature vectors corresponding to a set of events associated with selected user placed into a sequence in accordance with a set of time indicators;
generating a plurality of non-sequential feature vectors based on unlabeled non-sequential data associated with the plurality of users, the unlabeled non-sequential data representing non-sequential user-specific data;
combining the plurality of sequential feature vectors in the plurality of user-specific journeys and the plurality of non-sequential feature vectors;
creating at least one embedding based on the combination of the plurality of sequential feature vectors in the user-specific journey and the plurality of non-sequential feature vectors and a set of weights, an embedding comprising a set of fixed length vectors representing sequential human activity of the user for generating user-specific activity predictions and recommendations by a plurality of prediction models;
generating a set of predictions associated with the at least one user by the plurality of prediction models based on the at least one embedding, the set of predictions comprising at least one prediction or recommendation;
generating, by a decoder component, a plurality of regenerated sequential feature vectors and a plurality of regenerated non-sequential feature vectors based on the plurality of embeddings;
comparing, by a comparison component, the plurality of regenerated sequential feature vectors to the plurality of sequential feature vectors and the plurality of regenerated non-sequential feature vectors to the plurality of non-sequential feature vectors to identify a set of errors, wherein the set of errors are used to update the set of weights; and
generating explainability data, the explainability data indicating contribution of a dimension value of the embedding to the user-specific predictions generated by the plurality of prediction models.

17. The one or more computer storage devices of claim 16, wherein the operations further comprise:
analyzing, by an encoder component, input data for training a self-supervised activity sequencing model, wherein the input data comprises unlabeled historical human activity data;
generating, by the encoder component, an embedding representing sequenced human activity; and
performing, by the comparison component, back propagation.

18. The one or more computer storage devices of claim 16, wherein the operations further comprise:
receiving, from a customer data platform, updated activity data representing a set of new activities by a second user in the plurality of users in real-time;
generating, by a sequencing component, an updated user-specific journey for the second user; and
creating, by the embedding component, an updated user-specific embedding for the second user, wherein the updated user-specific embedding comprises a set of fixed length embeddings representing human activities associated with the second user, including the set of new activities described in the updated activity data.

19. The one or more computer storage devices of claim 16,
wherein the explainability data is presented as a separate output from the plurality of embeddings.

20. The one or more computer storage devices of claim 16, wherein the operations further comprise:
fine-tuning the embedding component using labeled input data to generate embeddings for a predictive model selected from a set of machine learning prediction models.

* * * * *